(12) United States Patent
Tachibana et al.

(10) Patent No.: US 8,210,224 B2
(45) Date of Patent: Jul. 3, 2012

(54) APPARATUS FOR JOINING CARCASS PLY

(75) Inventors: Makoto Tachibana, Hiroshima (JP);
Yoshinori Miyamoto, Hiroshima (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 338 days.

(21) Appl. No.: 12/461,361

(22) Filed: Aug. 10, 2009

(65) Prior Publication Data

US 2010/0212836 A1 Aug. 26, 2010

(30) Foreign Application Priority Data

Feb. 23, 2009 (JP) .................. 2009-038821

(51) Int. Cl.
B29D 30/20 (2006.01)

(52) U.S. Cl. ............ 156/421; 156/134; 156/304.1; 156/502; 156/544

(58) Field of Classification Search .......... 156/134, 156/218, 304.1, 421, 405.1, 502, 544, 507
See application file for complete search history.

(56) References Cited

U.S. PATENT DOCUMENTS

| 4,454,000 A | 6/1984 | Schlemmer |
| 4,769,104 A * | 9/1988 | Okuyama et al. .......... 156/406.4 |
| 4,793,890 A | 12/1988 | Sato |
| 4,867,823 A | 9/1989 | Pizzorno |
| 5,228,941 A | 7/1993 | Panicali |
| 5,328,532 A | 7/1994 | Azuma et al. |
| 2008/0017297 A1 * | 1/2008 | Tanaka et al. ............. 156/110.1 |

FOREIGN PATENT DOCUMENTS

| EP | 0 561 374 A1 | 9/1993 |
| EP | 1 108 510 A1 | 6/2001 |
| EP | 1 862 296 A1 | 12/2007 |
| JP | H07-276530 | 10/1995 |
| JP | H08-238686 | 9/1996 |
| JP | H09-070902 | 3/1997 |
| JP | 2000-167945 | 6/2000 |
| JP | 2001-062940 | 3/2001 |
| JP | 2001-179846 | 7/2001 |
| JP | 2001-191422 A * | 7/2001 |
| JP | 2003-019761 | 1/2003 |

* cited by examiner

Primary Examiner — Geoffrey L Knable

(74) Attorney, Agent, or Firm — Manabu Kanesaka

(57) ABSTRACT

An apparatus for joining a carcass ply, which butt-joins a wind start end and a wind finish end of a carcass ply wound around a cylindrical drum, is disclosed. The apparatus comprises: a joining section for joining the ends of the carcass ply; and aligning sections for aligning the ends of the carcass ply during joining by the joining section, the joining section and the aligning sections being disposed below the cylindrical drum supported in a horizontal state.

3 Claims, 18 Drawing Sheets

APPARATUS FOR JOINING CARCASS PLY

TECHNICAL FIELD

This invention relates to an apparatus for joining a carcass ply which is used as a material for constituting a tire in a tire manufacturing process.

BACKGROUND ART

With this type of apparatus, a carcass ply is formed as a band-shaped member by winding a sheet-shaped material, cut to a size of one tire, around a cylindrical drum, and butt-joining ends thereof (a wind start end and a wind finish end). To ensure the strength of a joint formed by butt joining, it is necessary to dispose cone-shaped joining rollers (toe-in roller devices) on both surfaces of the carcass ply and generate a pressing force strongly from both sides of the line of joining (or the joining line or joint line).

To attain the above-mentioned purpose, Patent Document 1, for example, discloses a structure in which drum segments (pieces) forming a cylindrical portion for supporting the ends of a carcass ply to be joined (hereinafter referred to as the joining ends or joint ends) are sequentially retreated in accordance with the movement of the joining apparatus, whereby joining can be performed accurately.

Patent Document 2 discloses a joining apparatus in which the joint ends of a carcass ply are held between a pressing member and a support roller having a spiral ridge to draw the ends to each other, and a restraint member for restraining overlapping or the like of the ends is disposed in the center, whereby joining can be performed accurately.

Further, Patent Document 3 discloses a joining apparatus in which the lower side of a carcass ply is supported by a receiving piece of a nearly T-shaped receiving body, while a dowel body (joining means) disposed on the upper side of the carcass ply is moved, with the supporting piece of the receiving body running in a small clearance of the carcass ply in a preceding manner, whereby joining can be performed accurately.

SUMMARY OF INVENTION

Technical Problem

With the structure disclosed in Patent Document 1, however, the joint ends are simply borne on the drum segments (pieces). In this case, when the drum segments (pieces) are retreated radially inwardly, the joint ends may sag, or there may be a gap between the joint end surfaces. The provision, inside the drum, of the structure in which the drum segments (pieces) are retreated radially inwardly may also pose the problem that the structure is complicated, its production is difficult, and its accuracy is difficult to maintain.

In the apparatus disclosed in Patent Document 2, the carcass ply is moved, with its free end surfaces being held by the support roller. If the holding force of the support roller is strong, the carcass ply moves too much, resulting in an overlap of the joint ends. If the holding force of the support roller is weak, the force to draw the joint ends together does not occur. This involves the problem that the holding force is very difficult to adjust, leading to the lack of versatility.

The apparatus disclosed in Patent Document 3 poses the following problem: The dowel body (joining means) is disposed only on the upper side of the carcass ply, and the force to draw the joint ends to each other acts only on one surface of the carcass ply. Thus, it has been difficult to bring the joint ends accurately close to each other, and so doing has been unreliable.

The present invention has been accomplished in the light of the above-mentioned problems. It is an object of this invention to provide a reliable apparatus for joining a carcass ply, in which a joining section is disposed together with aligning sections below a drum, whereby the drum can be simplified and accurate joining can be performed.

Solution to Problem

An aspect of the present invention for attaining the above object is an apparatus for joining a carcass ply, which butt-joins a wind start end and a wind finish end of a carcass ply wound around a cylindrical drum, comprising:
 a joining section for joining the ends of the carcass ply; and
 aligning sections for aligning the ends of the carcass ply during joining by the joining section,
 the joining section and the aligning sections being disposed below the cylindrical drum supported in a horizontal state.

A pair of the joining sections may be installed at a right position and a left position so as to be slidable in an axial direction of the drum, each of the joining sections comprising an upper cone-shaped joining roller and a lower cone-shaped joining roller as a pair, upper and lower vertical drive sections for driving the joining rollers in a vertical direction, and a connecting member for connecting the vertical drive sections.

Each of the aligning sections may comprise a multiplicity of aligning rollers, and a multiplicity of roller drive sections for supporting the aligning rollers rotatably and driving the aligning rollers from a central side of the carcass ply toward a joining end of the carcass ply while pressing the carcass ply against the cylindrical drum by the aligning rollers, the aligning rollers and the roller drive sections being installed on both sides of a joining line of the carcass ply and along the joining line.

A scooping plate for scooping joining ends of the carcass ply may be disposed in the lower vertical drive section of each joining section forwardly in an advancing direction of the lower joining roller.

Wedge-shaped slant portions may be formed in parts of the connecting member which joining end surfaces of the carcass ply contact, whereby a function of a partition plate for preventing an overlap of the joining end surfaces is imparted.

Advantageous Effects of Invention

According to the apparatus for joining a carcass ply concerned with the present invention, the joining sections are disposed, together with the aligning sections, below the drum. Thus, the property of the ends of the carcass ply deforming downward (outwardly of the drum) is effectively restrained from below (from outside the drum), so that accurate joining can be performed without requiring delicate adjustments. Moreover, a device for joining need not be disposed within the drum. Thus, the drum can be simplified, and restrictions on the spaces of the joining sections and the aligning sections are relaxed. Also, the rigidity of the joining apparatus is increased to enhance the reliability of the apparatus.

DESCRIPTION OF EMBODIMENTS

An apparatus for joining a carcass ply according to the present invention will now be described in detail by embodiments using the appended drawings.

Embodiment 1

Figure 1:
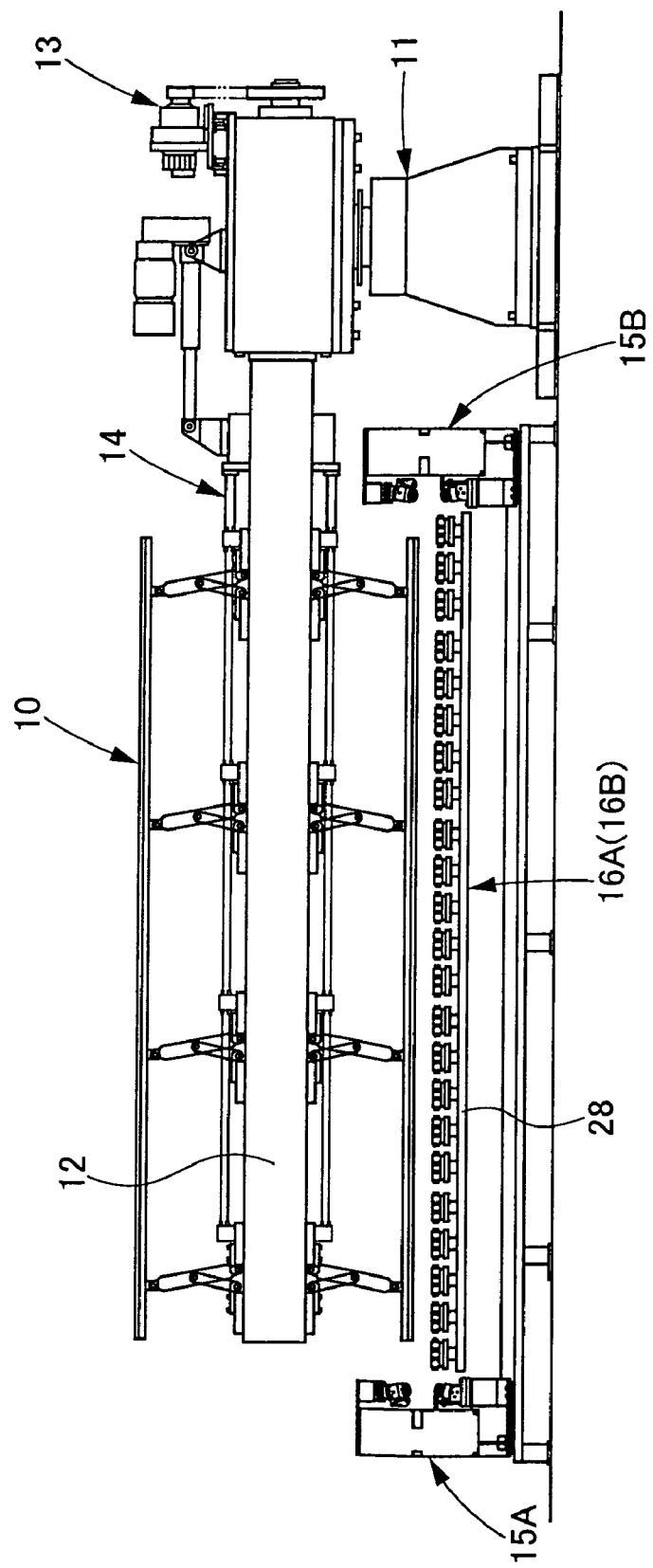
FIG. 1 is a front view of an apparatus for joining a carcass ply, showing Embodiment 1 of the present invention.
Figure 2:
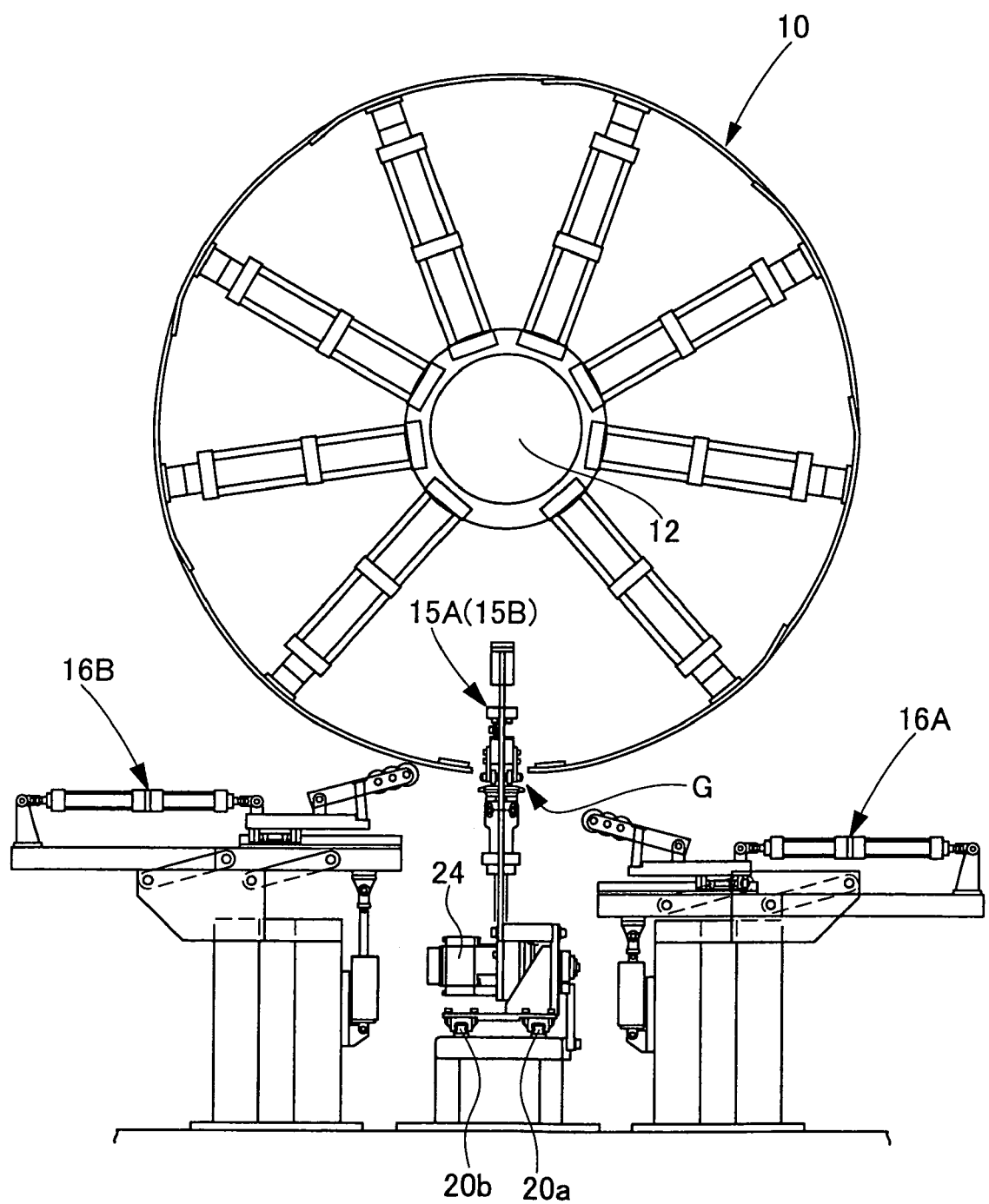
FIG. 2 is a side view of the apparatus for joining a carcass ply.
Figure 3:
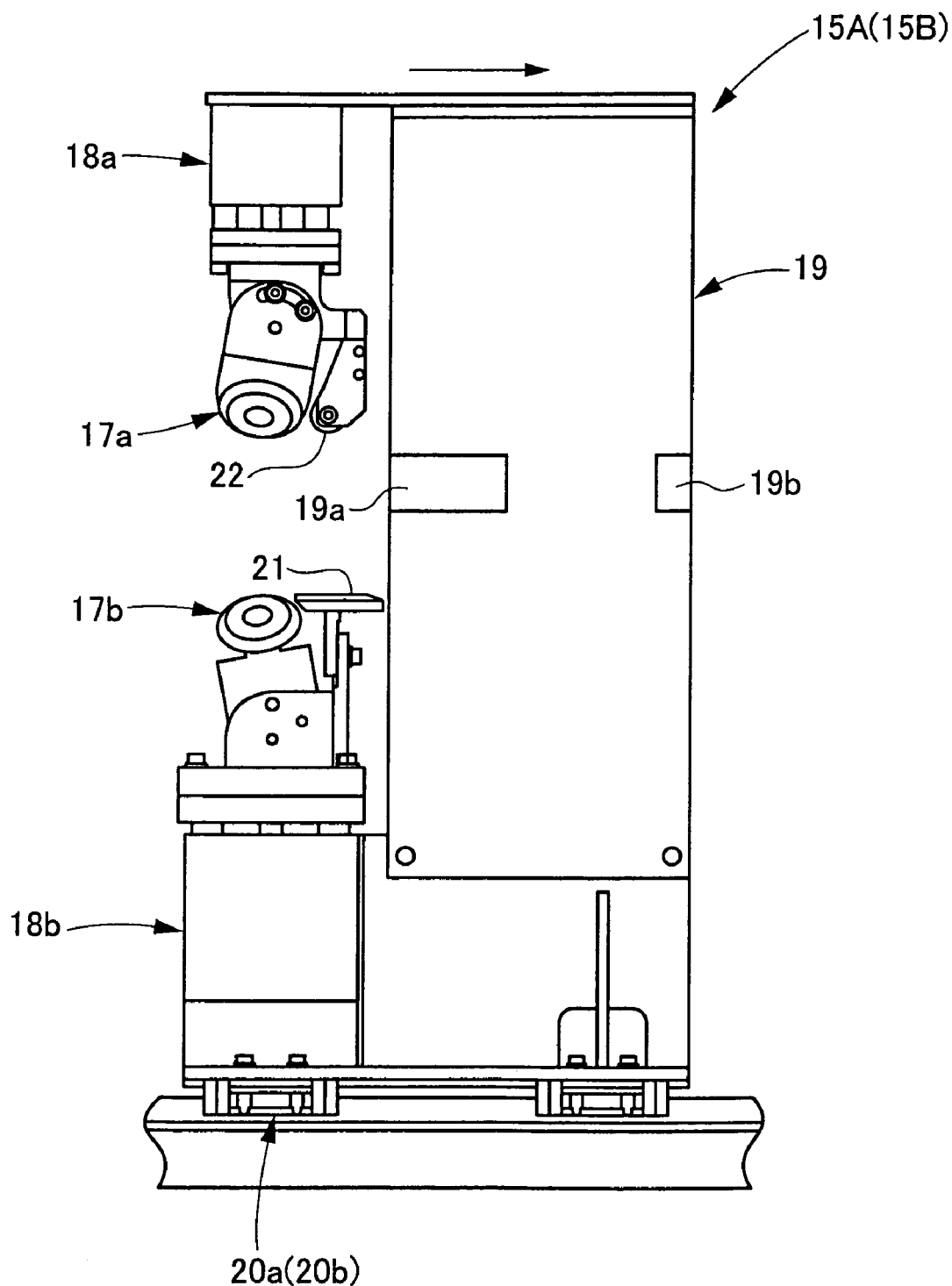
FIG. 3 is a front view of a joining section.
Figure 4:
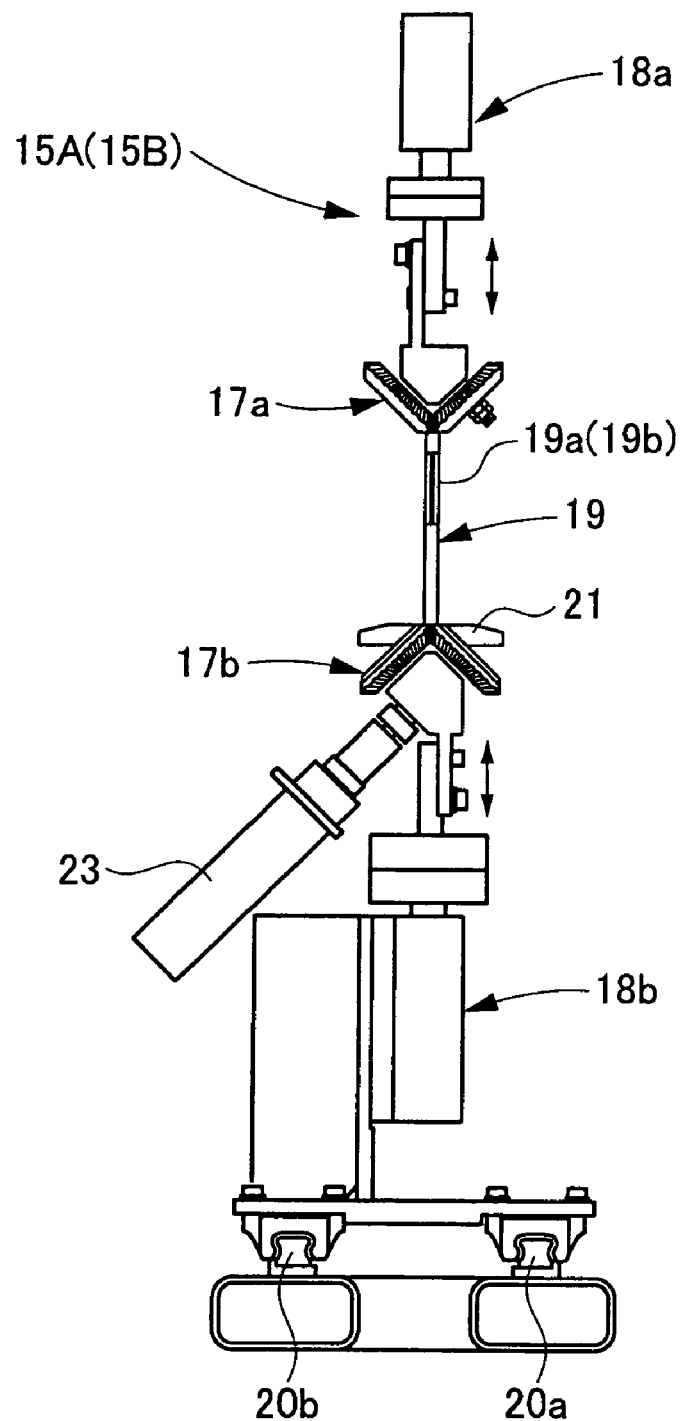
FIG. 4 is a side view of the joining section.
Figure 5:
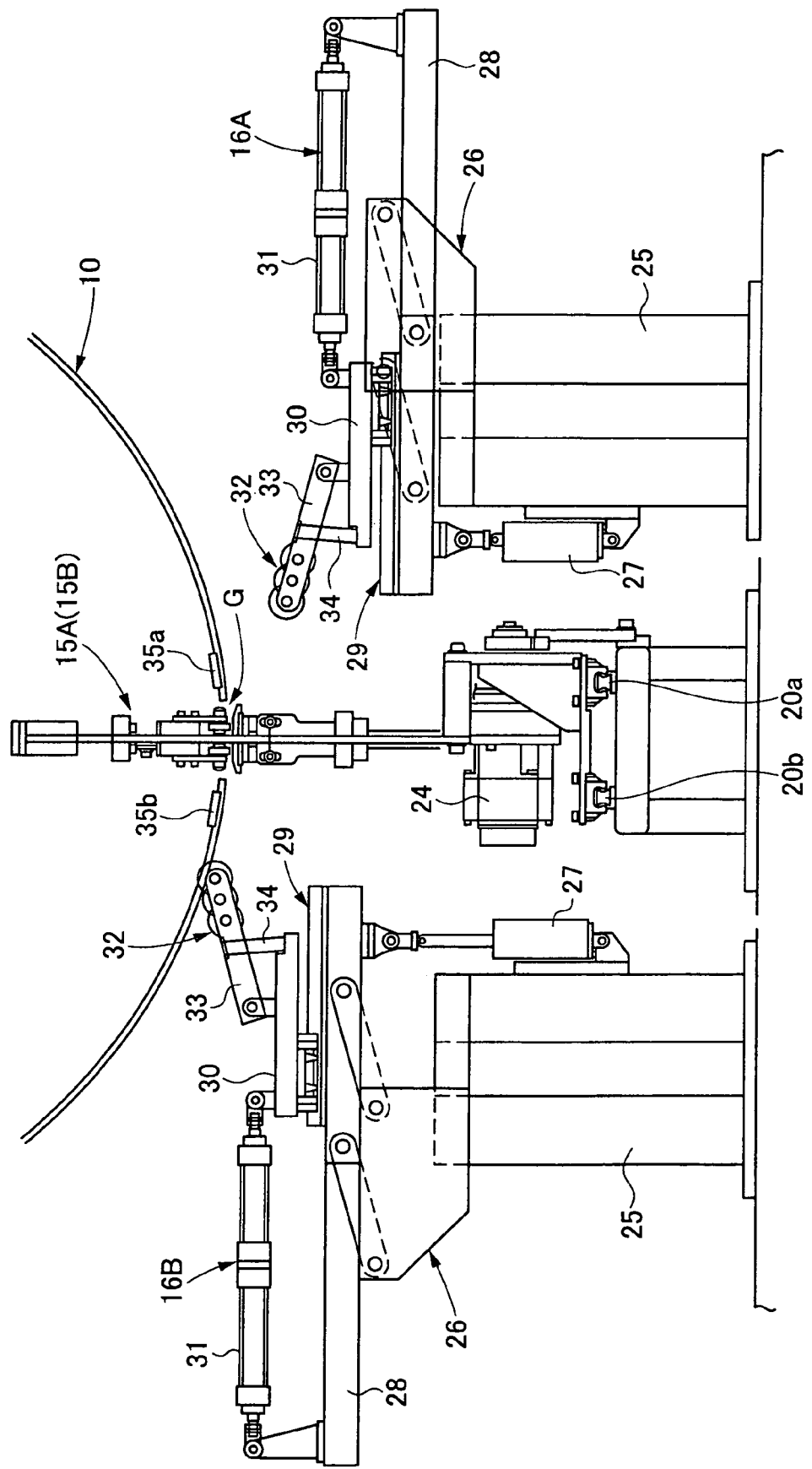
FIG. 5 is a detailed side view of aligning sections.
Figure 6:
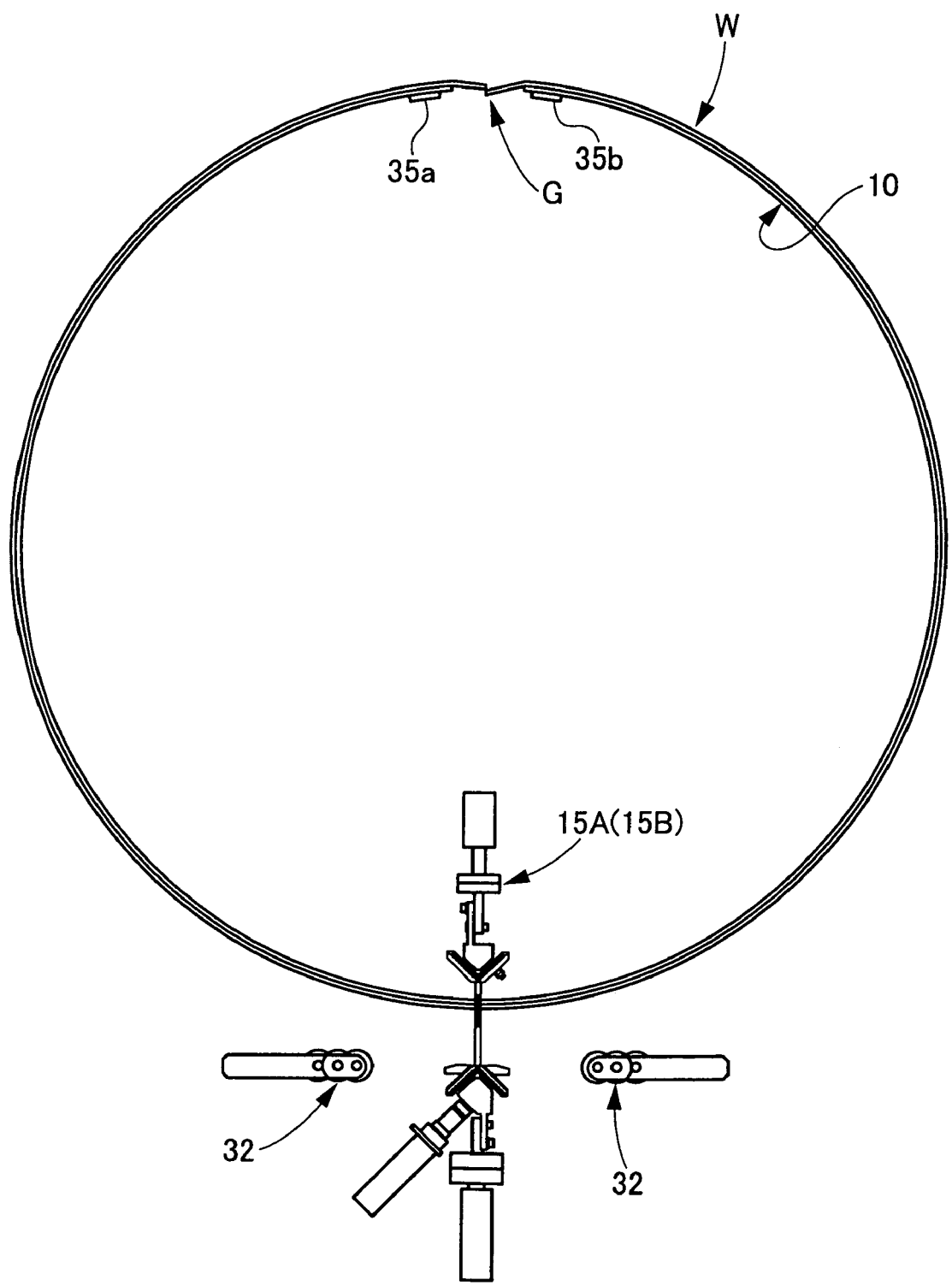
FIG. 6 is a motion explanation drawing of a cylindrical drum.
Figure 7:
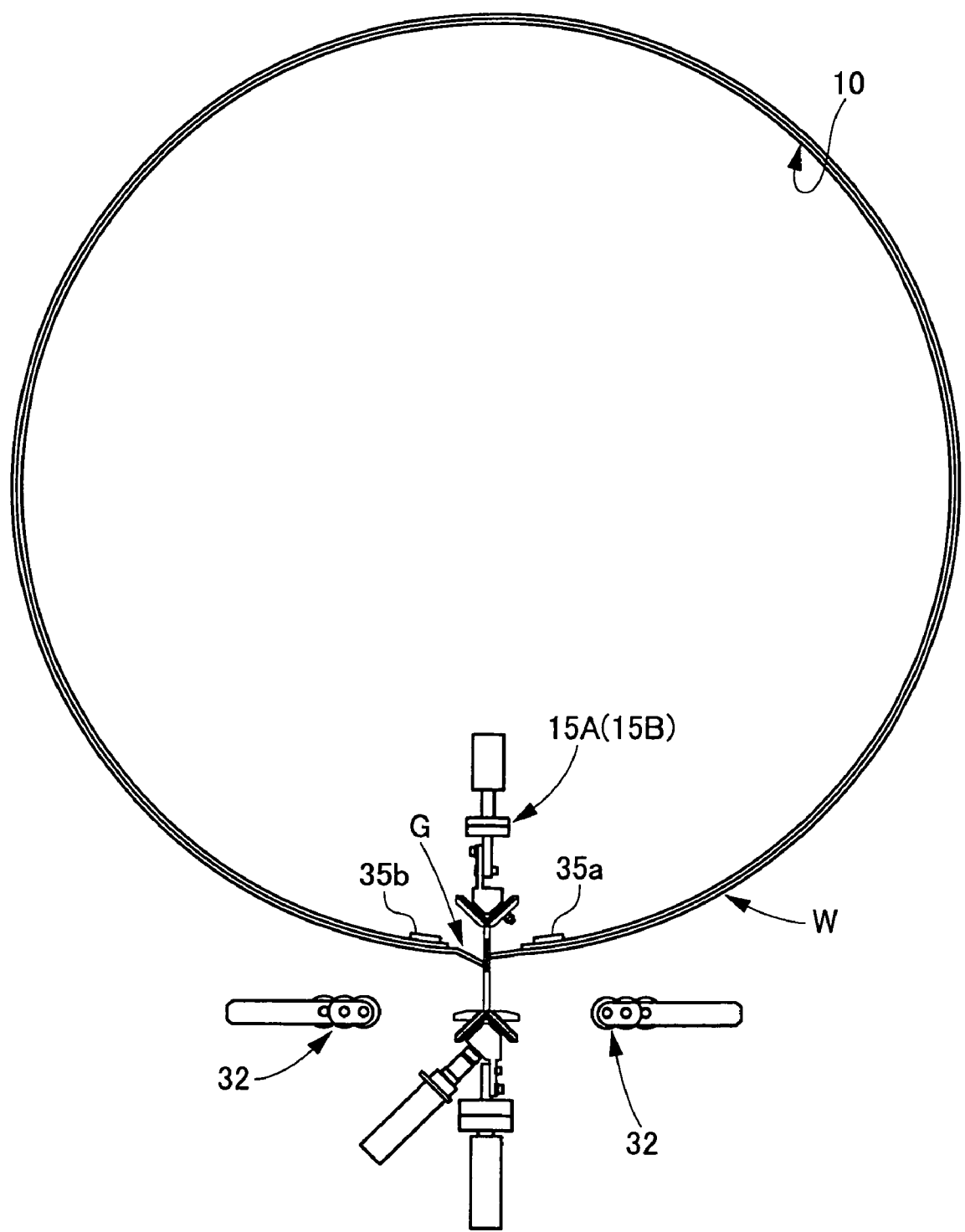
FIG. 7 is another motion explanation drawing of the cylindrical drum.
Figure 8:
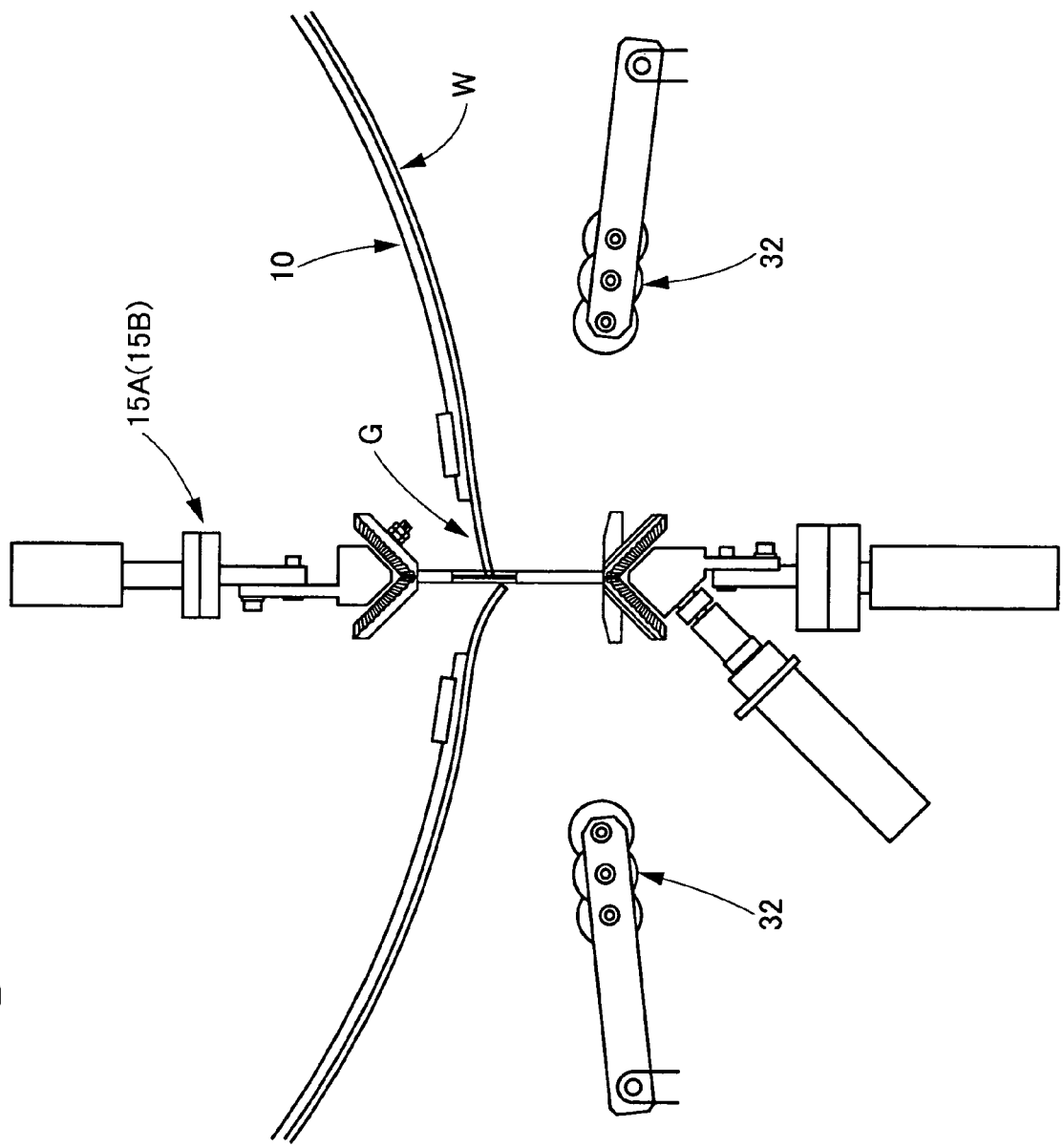
FIG. 8 is a detail view of FIG. 7.
Figure 9:
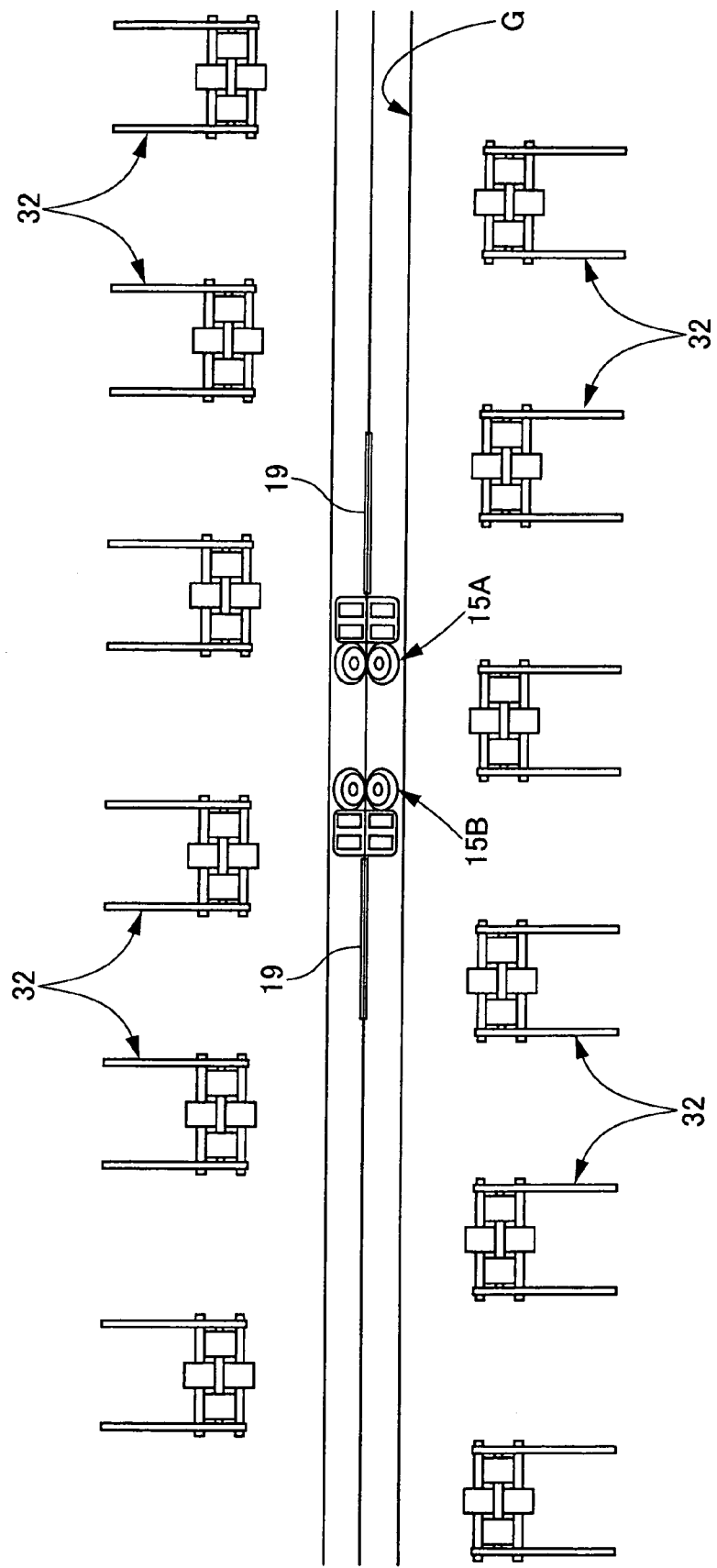
FIG. 9 is a motion explanation drawing of the joining sections.
Figure 10:
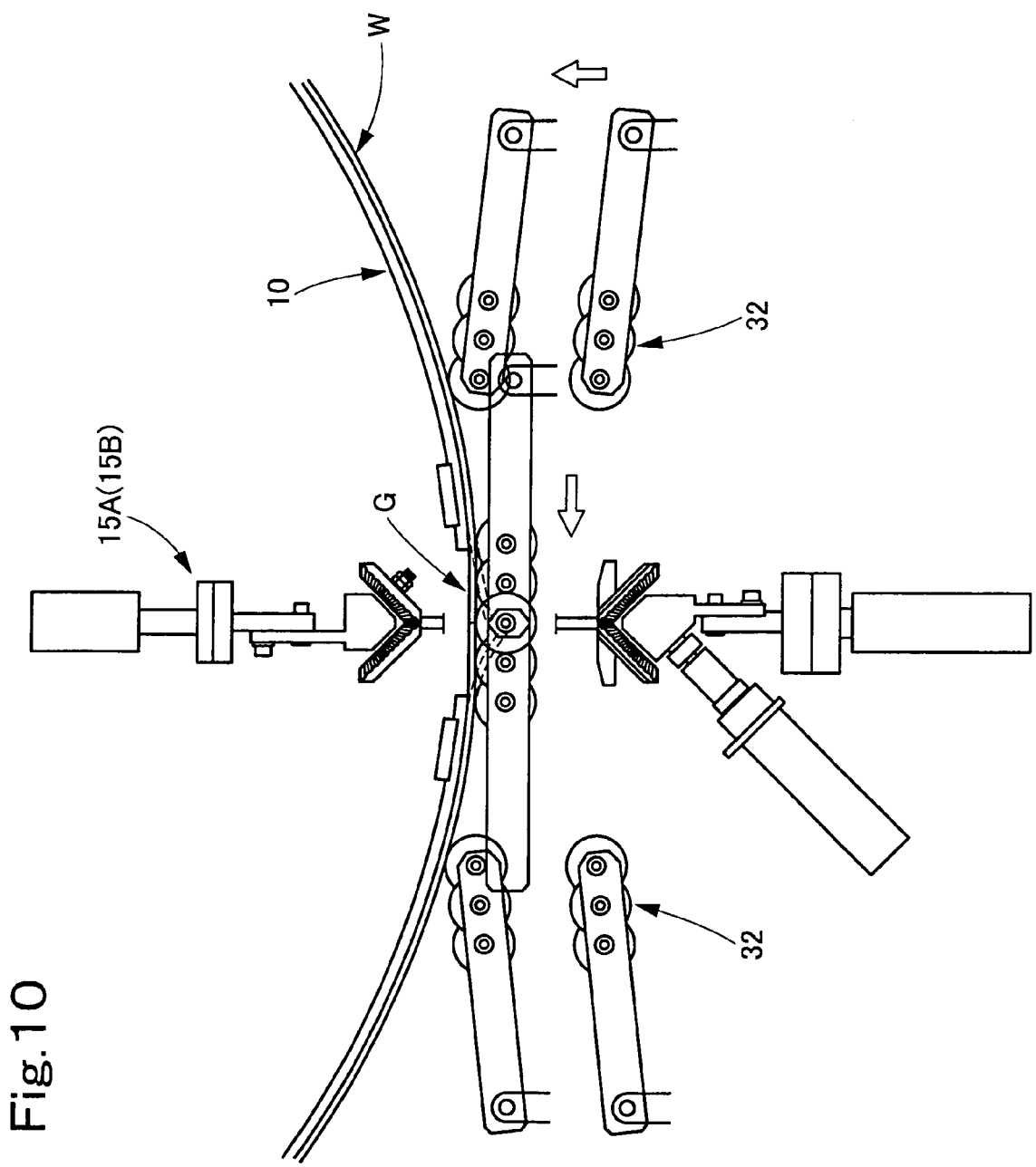
FIG. 10 is a motion explanation drawing of aligning rollers.
Figure 11:
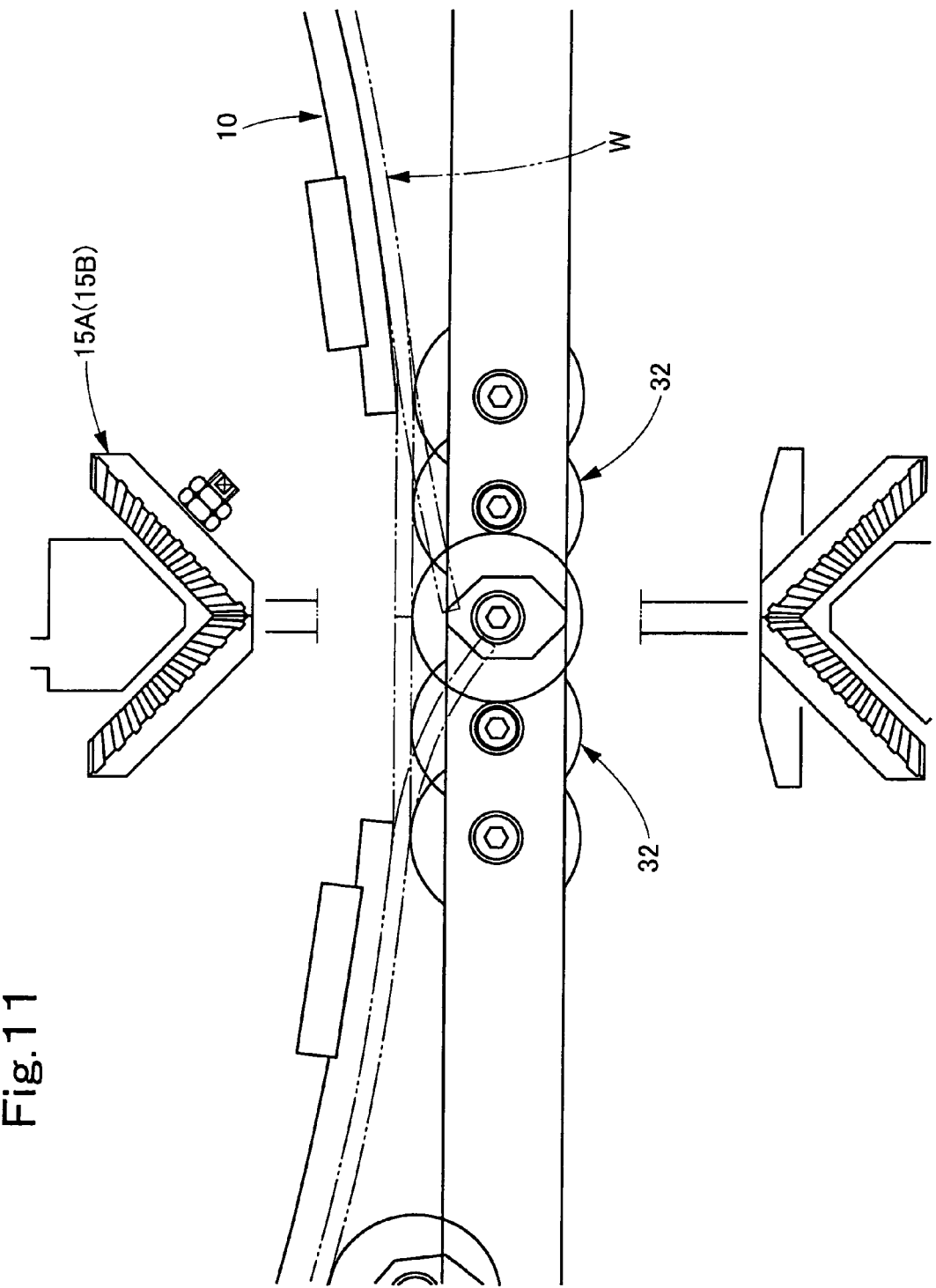
FIG. 11 is a detail view of FIG. 10.
Figure 12:
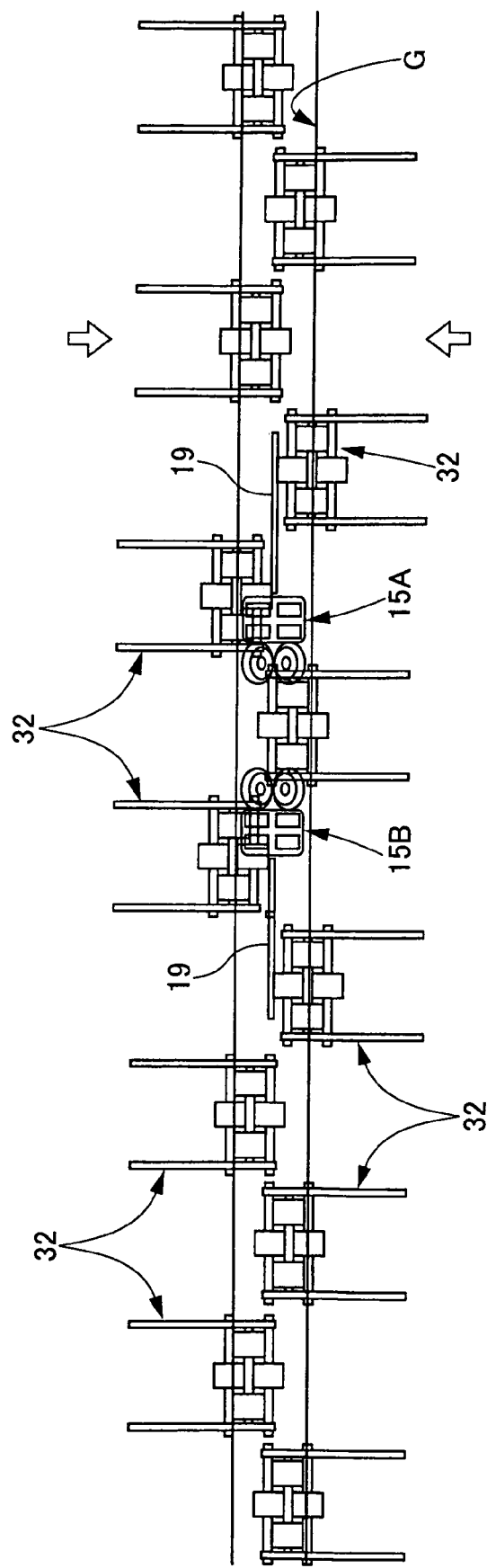
FIG. 12 is a motion explanation drawing of the aligning sections.
Figure 13:
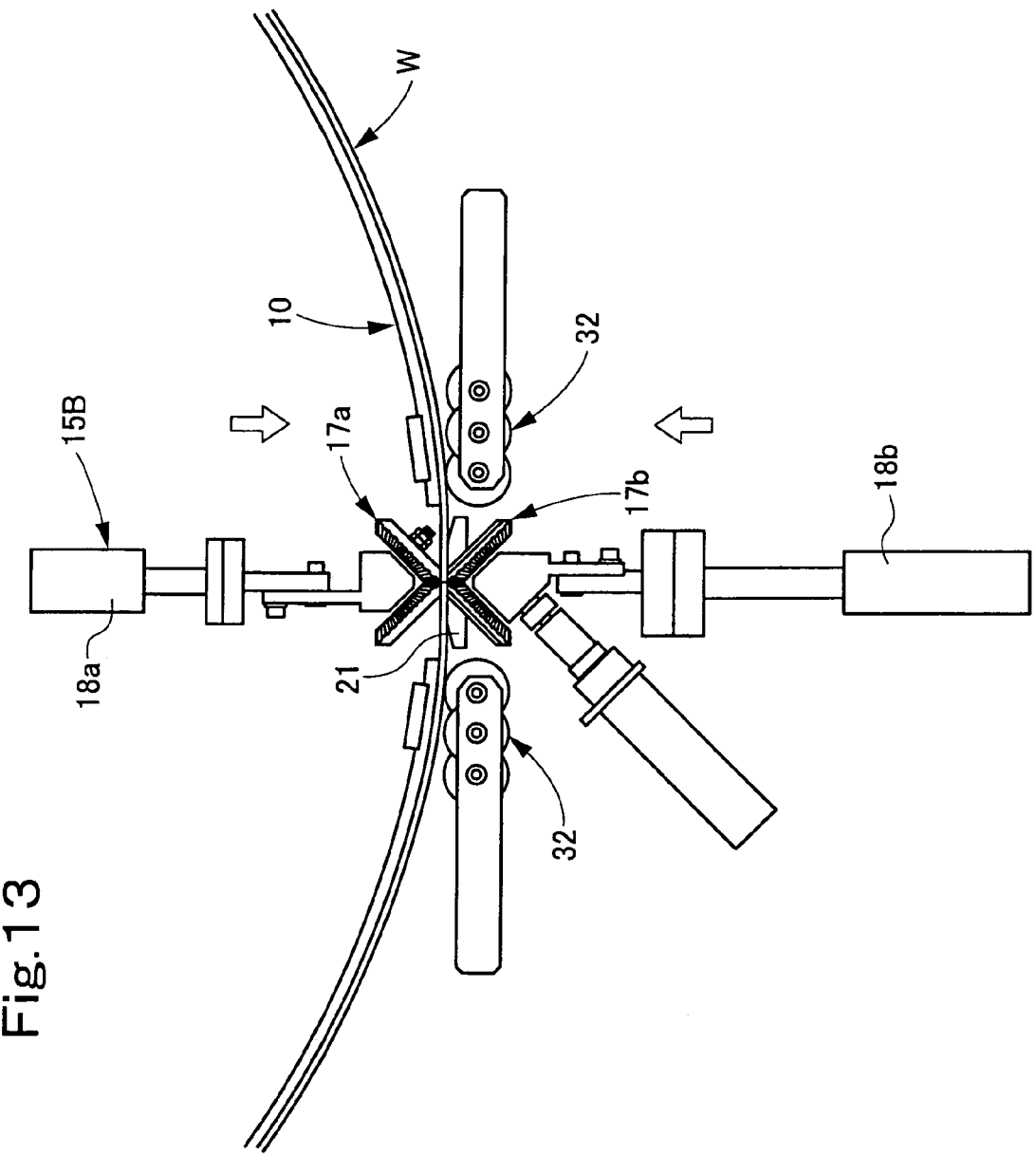
FIG. 13 is a motion explanation drawing of joining rollers and the aligning rollers.
Figure 14:
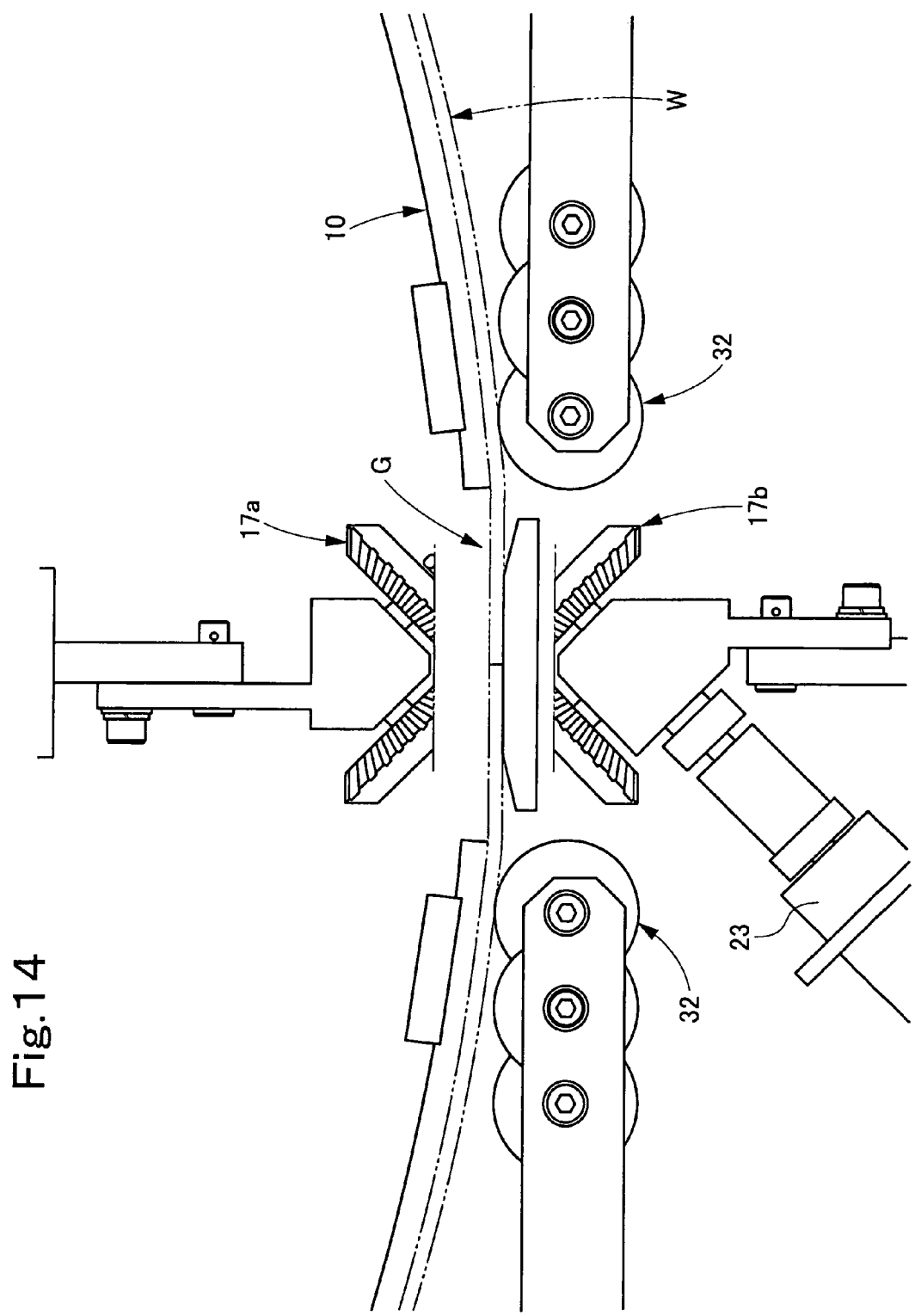
FIG. 14 is a detail view of FIG. 13.
Figure 15:
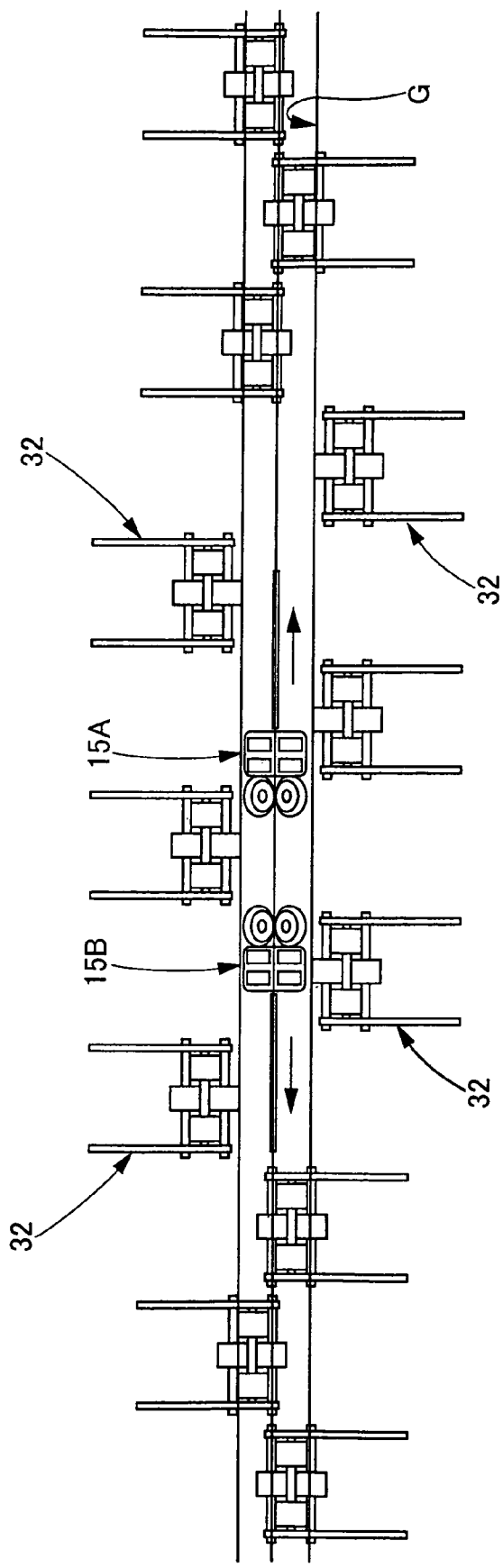
FIG. 15 is a motion explanation drawing of the aligning sections.
Figure 16:
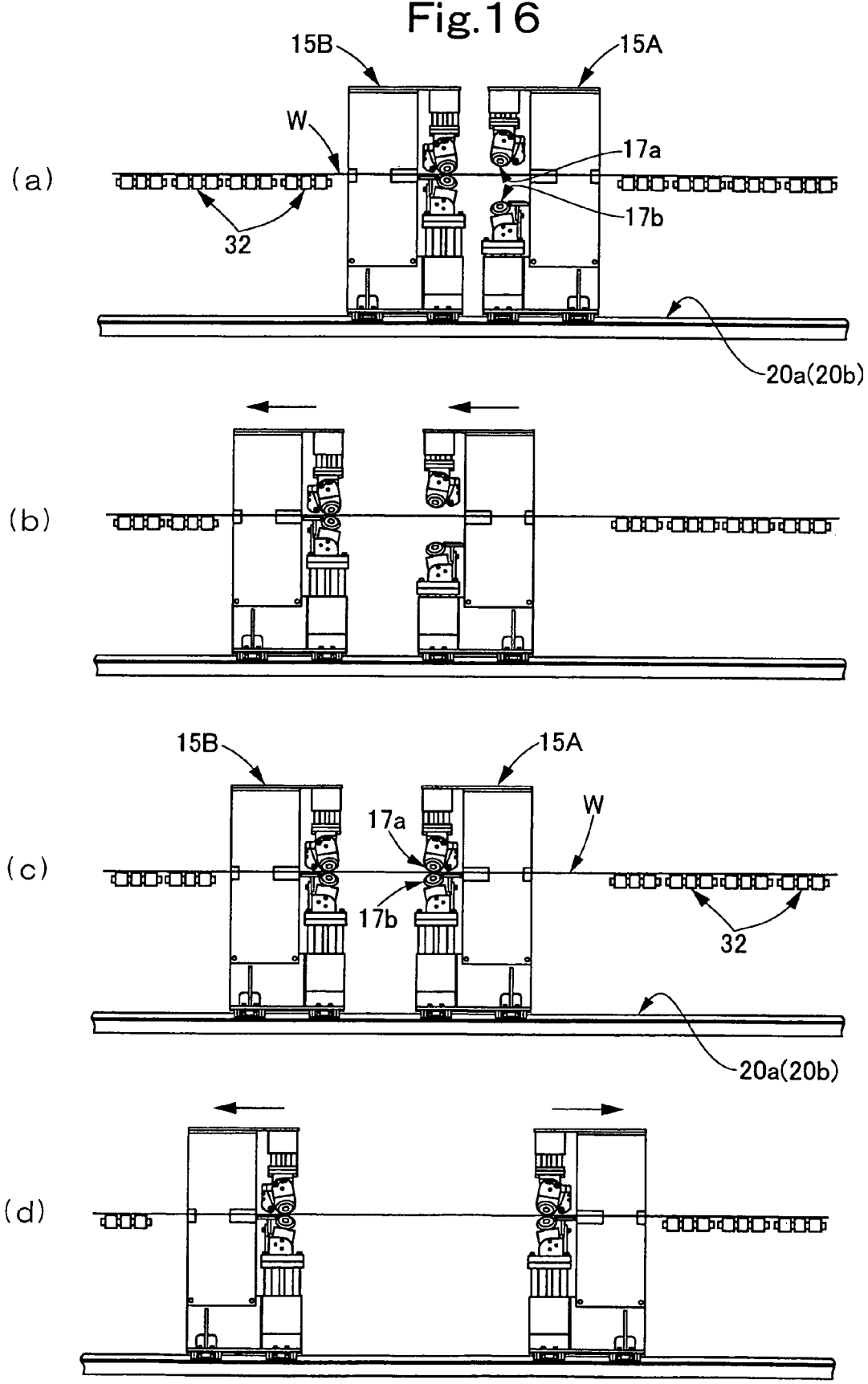
FIGS. 16(*a*) to 16 (*d*) are motion explanation drawings of the joining sections.

FIG. 1 is a front view of an apparatus for joining a carcass ply, showing Embodiment 1 of the present invention. FIG. 2 is a side view of the apparatus for joining a carcass ply. FIG. 3 is a front view of a joining section. FIG. 4 is a side view of the joining section. FIG. 5 is a detailed side view of aligning sections. FIG. 6 is a motion explanation drawing of a cylindrical drum. FIG. 7 is another motion explanation drawing of the cylindrical drum. FIG. 8 is a detail view of FIG. 7. FIG. 9 is a motion explanation drawing of the joining sections. FIG. 10 is a motion explanation drawing of aligning rollers. FIG. 11 is a detail view of FIG. 10. FIG. 12 is a motion explanation drawing of the aligning sections. FIG. 13 is a motion explanation drawing of joining rollers and the aligning rollers. FIG. 14 is a detail view of FIG. 13. FIG. 15 is a motion explanation drawing of the aligning sections. FIGS. 16(*a*) to 16(*d*) are motion explanation drawings of the joining sections.

As shown in FIGS. 1 and 2, a cylindrical drum 10 wound with a carcass ply W corresponding to one tire (to be described later) is supported on a horizontal rotating shaft 12 of a drum support section 11 so as to be rotatable by a rotational drive section 13 and expansible and contractible by an expansion/contraction mechanism 14.

A pair of (right and left) joining sections 15A and 15B, which run in the axial direction of the drum along an opening portion (gap) G of the cylindrical drum 10 and join ends (a wind start end and a wind finish end) of the carcass ply W facing and entering the opening portion G, and a pair of (front and rear) aligning sections 16A and 16B for approaching and aligning the ends of the carcass ply W during joining by the joining sections 15A and 15B, are arranged below the cylindrical drum 10. The opening portion G is designed to be naturally formed when the diameter of the cylindrical drum 10 (respective segments thereof) is increased.

The joining sections 15A, 15B, as shown in FIGS. 3 and 4, each include a pair of (upper and lower) cone-shaped joining rollers (toe-in roller devices) 17*a* and 17*b*, vertical drive sections 18*a* and 18*b* for driving the joining rollers 17*a* and 17*b* in a vertical direction by cylinders or the like, and a thin plate-shaped connecting member 19 for connecting the vertical drive sections 18*a* and 18*b*. The joining sections 15A and 15B can each be allowed to run (slide) by a joining section travel drive motor 24 (see FIG. 2) via a pair of (front and rear) linear guides 20*a* and 20*b* extending in the axial direction of the drum on a suitable counter.

The lower vertical drive section 18*b* has a scooping plate 21 disposed forwardly of the lower joining roller 17*b* in the advancing direction of the joining roller 17*b* (see an arrow in FIG. 3), the scooping plate 21 being adapted to scoop joint ends of the carcass ply W. In front and rear edge parts of the connecting member 19, wedge-shaped slant portions 19*a* and 19*b* are formed in their parts which joining or joint end surfaces of the carcass ply W contact, whereby the function of a partition plate for preventing an overlap of the joint end surfaces is imparted. In FIG. 3, an auxiliary roller 22 is adapted to hold the joint ends of the carcass ply W between the auxiliary roller 22 and the scooping plate 21.

In the upper and lower paired cone-shaped joining rollers (toe-in roller devices) 17*a* and 17*b*, one of the constituent rollers of the lower joining roller 17*b* is rotationally driven by a cone-shaped roller drive motor 23, whereby the other constituent roller is also rotated in the opposite direction via a bevel gear mechanism. As a result, the function of a so-called shifting roller is achieved. On the other hand, the upper joining roller 17*a* holds the joint ends of the carcass ply W between it and the lower joining roller 17*b*. In this state, the joining sections 15A, 15B run, whereby both rollers are rotated in a following manner. Thus, the function of a so-called shifting roller is achieved.

The aligning sections 16A and 16B, as shown in FIG. 5, are arranged on both sides of the travel line of the right and left paired joining sections 15A and 15B, and are of the same configuration, except for a part thereof to be described later. That is, the aligning sections 16A and 16B have support stands 28 installed horizontally on a pair of (right and left) counters 25 so as to be ascendable and descendable by the action of a pair of (right and left) parallel links 26 and a pair of (right and left) hoisting cylinders 27. The support stand 28 is a long object having a length slightly exceeding the entire length of the cylindrical drum 10 (see FIG. 1).

A slider 30 is placed on the support stand 28 so as to be movable (slidable) in a fore-and-aft direction (a direction orthogonal to the travel line of the joining sections 15A and 15B) via a linear guide 29. A two-stage cylinder 31 for slider driving is interposed between the slider 30 and the support stand 28. These members (linear guide 29, slider 30, two-stage cylinder 31, etc.) constitute a roller drive section, and a multiplicity of these roller drive sections are installed on each support stand 28 in its right-and-left direction (a direction along the travel line of the joining sections 15A and 15B) (see FIG. 1).

Proximal ends of a pair of (right and left) arms 33, which support the constituent rollers of aligning rollers 32 near the leading ends thereof so as to be rotatable in forward and rearward directions, are pinned onto the sliders 30. A spring 34 for always urging the leading end side of the arm 33 upward is interposed between an intermediate site of the arm 33 and the slider 30.

The aligning roller 32 is composed of four rollers, i.e., two rollers arranged forward and rearward, and two rollers arranged on both sides of these rollers overlappingly in the fore-and-aft direction, as shown in FIG. 9. That is, as many of the aligning rollers 32 as possible are arranged in the fore-and-aft direction (the direction from the central side of the carcass ply toward the joint ends thereof) so that the end side of the carcass ply W located on the respective rollers can be linearly supported and regulated.

As will be seen from the layout of the aligning rollers 32 shown in FIG. 9, the roller drive sections of the aligning section 16A and the roller drive sections of the aligning section 16B are arranged in a staggered configuration (zigzag arrangement) in the right-and-left direction (the direction along the travel line of the joining sections 15A, 15B). At the extension limit position of the two-stage cylinder 31, namely, the most forward position of the aligning roller 32, the foremost rollers of the aligning rollers 32 of both the aligning section 16A and the aligning section 16B can be located on the line of joining of the carcass ply W (see FIG. 10).

In FIG. 5, magnets 35a, 35b embedded along the opening portion G of the cylindrical drum 10 can temporarily hold the end sides of the carcass ply W.

Next, the motions of the present apparatus for joining a carcass ply will be described using the appended drawings.

As shown in FIG. 6, the cylindrical drum 10 having the segments increased in diameter by the expansion/contraction mechanism 14 to form the surface of the cylinder is wound with the carcass ply W cut to a size corresponding to one tire. The wind ends of the carcass ply W are positioned at the center of the opening portion G of the cylindrical drum 10. (Winding may start in a lower part of the cylindrical drum 10, but here, starts in an upper part of the cylindrical drum 10.) Each end of the carcass ply W sags inwardly of the drum from the opening portion G of the cylindrical drum 10 under its own weight.

Then, as shown in FIGS. 7 and 8, the cylindrical drum 10 is rotated by the rotational drive section 13 to locate the opening portion G of the cylindrical drum 10 at a lower site. At this time, each end of the carcass ply W sags outwardly of the drum from the opening portion G of the cylindrical drum 10 under its own weight, with the result that the joint ends of the carcass ply W become open. The amount of the sag is not constant, but varies, depending on the characteristics of the carcass ply W, or the status of handling of the leading end or the rear end of the carcass ply W when wound.

Then, as shown in FIGS. 8 and 9, the right and left paired joining sections 15A and 15B are caused to run (slide) to nearly the center of the joining line of the carcass ply W by the respective joining section travel drive motors 24. This position is not necessarily required to be the center, but preferably should not be an end region. On this occasion, the carcass ply W wound on the cylindrical drum 10 does not wrinkle or move, because the wedge-shaped slant portions 19a and 19b (see FIG. 3) are formed in the portion of the connecting member 19 which the joint end surfaces of the carcass ply W contact.

Then, as shown in FIGS. 10 to 12, the support stands 28 of the front and rear paired aligning sections 16A and 16B are raised by the hoisting cylinders 27 to press the aligning rollers 32 against the cylindrical drum 10 (the lower surface of the carcass ply W) (see the state of the aligning section 16B in FIG. 5). Then, with this state being maintained, the aligning rollers 32 are moved from the outside of the opening portion G of the cylindrical drum 10 toward the center of the opening portion G by the two-stage cylinders 31. That is, the two-stage cylinders 31 are moved from the contraction limit position to the extension limit position.

The constituent rollers of each aligning roller 32 are arranged such that when the foremost roller has moved to the center of the opening portion G of the cylindrical drum 10, the rearmost roller contacts the opening end of the cylindrical drum 10. In this state, the constituent rollers in the rows are nearly horizontal (see FIG. 11). At this time, the ends of the carcass ply W (i.e., the wind start end and the wind finish end) are brought close to and aligned with each other, and are nearly in contact. However, gaps along the thickness of the connecting member are formed at the sites of the connecting members 19 of the joining sections 15A and 15B and places ahead of and behind them (see FIG. 12).

Then, as shown in FIGS. 13 and 14, the lower joining roller 17b of the left joining section 15B, for example, is raised by the vertical drive section 18b to bring the cone part of the joining roller 17b into contact with the lower surface of the ends of the carcass ply W. Simultaneously, the scooping plate 21 is also raised to make contact with the lower surface of the ends of the carcass ply W, whereby the ends of the carcass ply W (i.e., the wind start end and the wind finish end) separated by the connecting member 19 (the slant portions 19a, 19b) are aligned in a lifted form. Then, the upper joining roller 17a of the left joining section 15B is lowered by the vertical drive section 18a to bring the cone part of the joining roller 17a into contact with the upper surface of the ends of the carcass ply W.

Then, as shown in FIG. 15, the left joining section 15B is advanced (see the arrow in the drawing) along the linear guides 20a, 20b by the joining section travel drive motor 24. On this occasion, the aligning rollers 32 located ahead of the left joining section 15B are sequentially retracted by the two-stage cylinders 31. At this position of retraction (an intermediate position between the extension limit position and the contraction limit position of the two-stage cylinder 31), the carcass ply W is sandwiched between the foremost roller and the opening edge portion of the cylindrical drum 10 to hold the carcass ply W (see FIGS. 13 and 14).

Then, as shown in FIGS. 16(a) to 16(d), the right joining section 15A is retracted by the joining section travel drive motor 24 until the joining rollers 17a, 17b of the right joining section 15A are located at the position where joining by the left joining section 15B is started (see FIG. 16(a)→FIG. 16(b)). Then, the right joining section 15A is allowed to act in the same manner as is the left joining section 15B, as explained with reference to FIGS. 13 to 15, whereby the axially opposite sides of the ends of the carcass play W (see the arrow in FIG. 15) are joined together (see FIG. 16(c) →FIG. 16(d)).

Then, the right and left paired joining sections 15A and 15B are moved to the outside of the joining line of the carcass ply W to complete joining. Finally, the front and rear paired aligning sections 16A and 16B are lowered by the hoisting cylinders 27 to bring the joining action to a halt.

According to the present embodiment described above, the right and left paired joining sections 15A and 15B are disposed, together with the front and rear paired aligning sections 16A and 16B, below the cylindrical drum 10. Thus, the property of the ends of the carcass ply W deforming downward (outwardly of the drum) is effectively restrained from below (from outside the cylindrical drum 10), so that accurate joining can be performed without requiring delicate adjustments.

Nor is it necessary to dispose a device for joining within the cylindrical drum 10. Thus, the cylindrical drum 10 can be simplified, and restrictions on the spaces of the joining sections 15A, 15B and the aligning sections 16A, 16B are relaxed. Also, the rigidity of the joining apparatus is increased to enhance the reliability of the apparatus.

Moreover, the installation of the right and left paired joining sections 15A and 15B enables the ends of the wide carcass ply W to be joined smoothly and promptly.

Furthermore, many of the aligning rollers 32 of the front and rear paired aligning sections 16A and 16B are installed on both sides of the joining line of the carcass ply W and along the joining line. Thus, the aligning rollers 32 in cooperation with the scooping plates 21 of the right and left paired joining sections 15A and 15B enable the ends of the carcass ply W to be approached to and aligned with each other with high accuracy.

Embodiment 2

Figure 17:
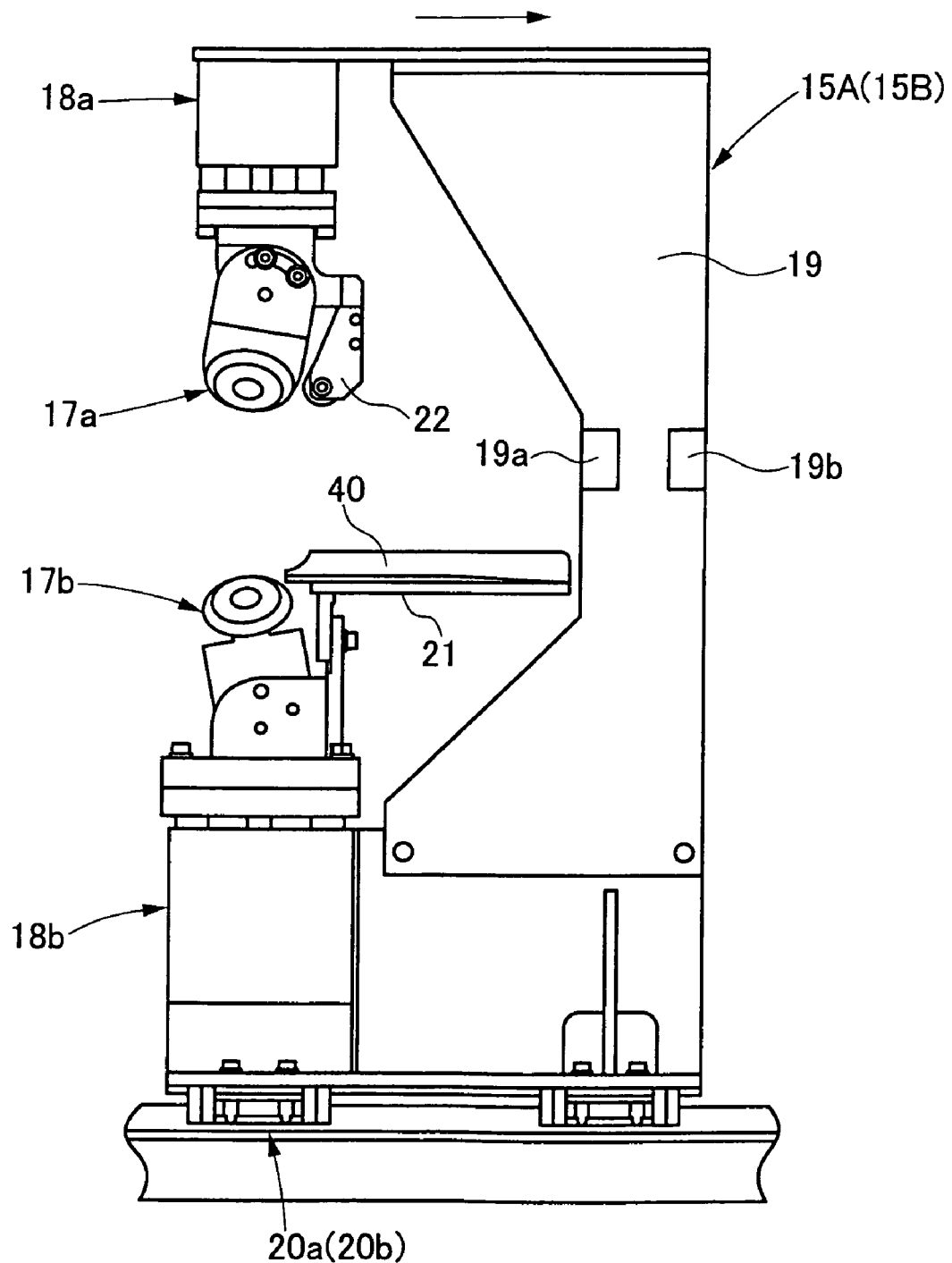
FIG. 17 is a front view of the joining section, showing Embodiment 2 of the present invention.
Figure 18:
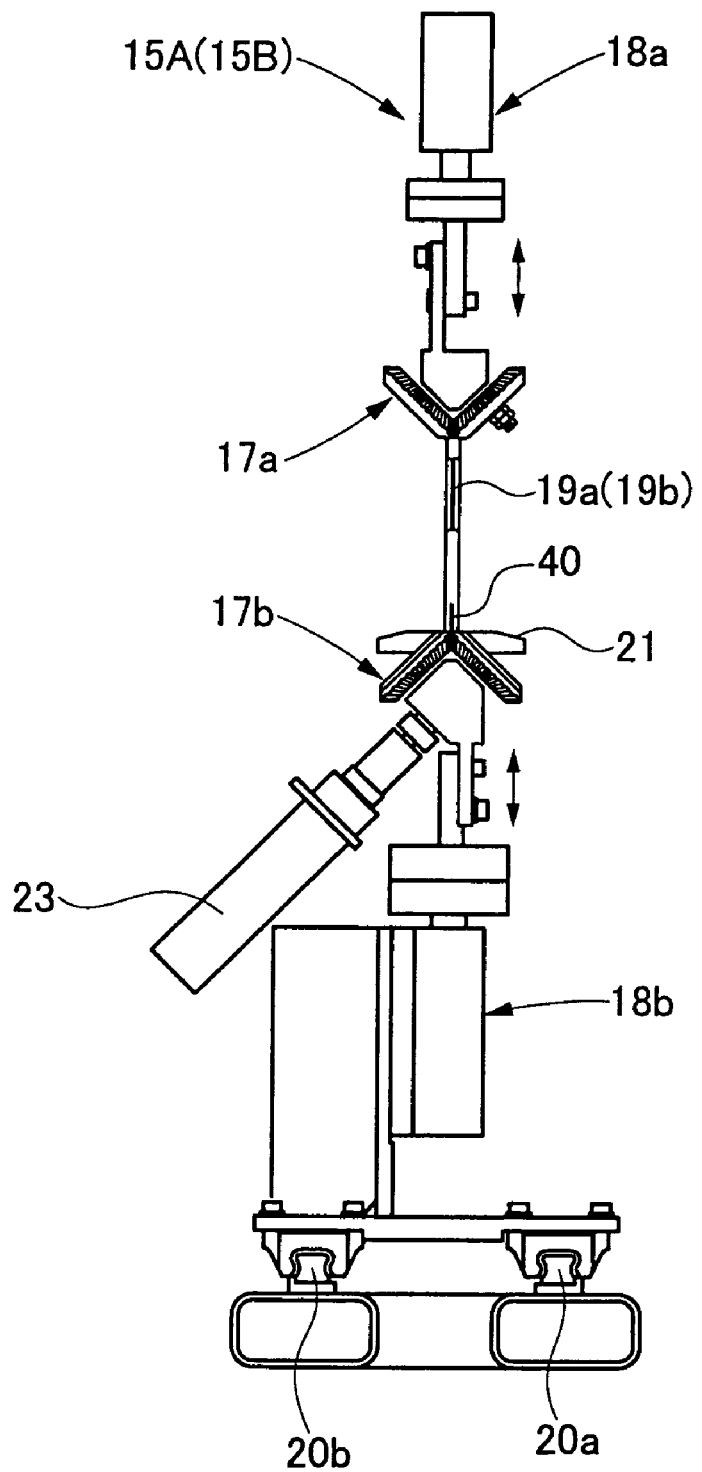
FIG. 18 is a side view of the joining section.

FIG. 17 is a front view of the joining section, showing Embodiment 2 of the present invention. FIG. 18 is a side view of the joining section.

This is an embodiment in which a partition plate 40 having the same function as that of the slant portions 19a, 19b of the connecting member 19 in Embodiment 1 is formed integrally with the scooping plate 21 of the lower vertical drive section 18b. The other features are the same as those in Embodiment 1, and thus duplicate explanations for them are omitted.

In the present embodiment, the same actions and effects as in Embodiment 1 are obtained.

It goes without saying that the present invention is not limited to the above embodiments, and various changes and modifications may be made without departing from the gist of the present invention. For example, the right and left paired joining sections may be limited to one of them, the linear guides of the joining section and the aligning section may be replaced by other moving mechanisms, or the number of the constituent rollers of the aligning roller may be increased or decreased. Furthermore, the opening portion in the axial direction of the drum, where the joining section runs, may be closed in a continuous cylindrical surface when the carcass ply is wound, but may be provided in an open form only during the joining action.

INDUSTRIAL APPLICABILITY

The apparatus for joining a carcass ply according to the present invention is preferably used in equipment for producing a large tire in a construction vehicle or the like.

REFERENCE SIGNS LIST

10 Cylindrical drum
11 Drum support section
12 Rotating shaft
13 Rotational drive section
14 Expansion/contraction mechanism
15A, 15B Joining section
16A, 16B Aligning section
17a, 17b Joining roller (toe-in roller device)
18a, 18b Vertical drive section
19 Connecting member
19a, 19b Slant portion
20a, 20b Linear guide
21 Scooping plate
22 Auxiliary roller
23 Cone-shaped roller drive motor
24 Joining section travel drive motor
25 Counter
26 Parallel link
27 Hoisting cylinder
28 Support stand
29 Linear guide
30 Slider
31 Two-stage cylinder
32 Aligning roller
33 Arm
34 Spring
35a, 35b Magnet
W Carcass ply
G Opening portion

CITATION LIST

Patent Literature

Patent Document 1: JP-A-2003-19761
Patent Document 2: Japanese Patent No. 3420727
Patent Document 3: Japanese Patent No. 3045459

The invention claimed is:

1. An apparatus for joining a carcass ply, which butt-joins a wind start end and a wind finish end of a carcass ply wound around a cylindrical drum, comprising:
   a pair of joining sections for joining the ends of the carcass ply; and
   aligning sections for aligning the ends of the carcass ply during joining by the joining section, wherein
   the joining sections and the aligning sections are disposed such that the ends of the carcass ply can be joined together below the cylindrical drum,
   the pair of joining sections are installed at a right position and a left position so as to be slidable along a travel line in an axial direction of the drum,
   each of the joining sections comprises an upper cone-shaped joining roller and a lower cone-shaped joining roller as a pair, upper and lower vertical drive sections for driving the joining rollers in a vertical direction, and a connecting member for connecting the vertical drive sections,
   each of the aligning sections comprises a multiplicity of aligning rollers, and a multiplicity of roller drive sections for supporting the aligning rollers rotatably and driving the aligning rollers in a direction orthogonal to the travel line of the joining sections from a central side of the carcass ply toward a joining end of the carcass ply while pressing the carcass ply against the cylindrical drum by the aligning rollers, and
   the aligning sections with the aligning rollers and the roller drive sections are installed on both sides of a joining line of the carcass ply and along the joining line.

2. The apparatus for joining a carcass ply according to claim 1, wherein a scooping plate for scooping joining ends of the carcass ply is disposed in the lower vertical drive section of each joining section forwardly in an advancing direction of a lower joining roller.

3. The apparatus for joining a carcass ply according to claim 1, wherein wedge-shaped slant portions are formed in parts of the connecting member where joining end surfaces of the carcass ply contact for preventing an overlap of the joining end surfaces.

* * * * *